(12) United States Patent
DeBoer et al.

(10) Patent No.: US 9,139,102 B2
(45) Date of Patent: Sep. 22, 2015

(54) ELECTRIC VEHICLE CHARGING STATION WITH A FIELD UPGRADEABLE COMMUNICATIONS FACILITY

(75) Inventors: John DeBoer, Denver, CO (US); Mario Bilac, Lawrenceville, GA (US); Harry Price Haas, Atlanta, GA (US); John Quentin Cowans, Decatur, GA (US); Timothy Biedrzycki, Powder Springs, GA (US); William A. King, Jr., Loganville, GA (US)

(73) Assignee: Siemens Industry, Inc., Alpharetta, GA (US)

( * ) Notice: Subject to any disclaimer, the term of this patent is extended or adjusted under 35 U.S.C. 154(b) by 529 days.

(21) Appl. No.: 13/482,164

(22) Filed: May 29, 2012

(65) Prior Publication Data

US 2013/0020991 A1  Jan. 24, 2013

Related U.S. Application Data

(60) Provisional application No. 61/509,171, filed on Jul. 19, 2011, provisional application No. 61/509,178, filed on Jul. 19, 2011.

(51) Int. Cl.
| | |
|---|---|
| *H02J 7/00* | (2006.01) |
| *H02J 7/14* | (2006.01) |
| *H02J 7/02* | (2006.01) |
| *H02J 7/04* | (2006.01) |
| *B60L 11/18* | (2006.01) |

(52) U.S. Cl.
CPC .......... *B60L 11/1838* (2013.01); *Y02T 10/7005* (2013.01); *Y02T 90/121* (2013.01); *Y02T 90/128* (2013.01); *Y02T 90/14* (2013.01); *Y02T 90/16* (2013.01); *Y02T 90/163* (2013.01)

(58) Field of Classification Search
CPC .............. B60L 11/1838; Y02T 90/121; Y02T 10/7005; Y02T 90/14; Y02T 90/16; Y02T 90/128; Y02T 90/163
USPC .......................... 320/104, 107, 109, 111, 165
See application file for complete search history.

(56) References Cited

U.S. PATENT DOCUMENTS

| | | | | |
|---|---|---|---|---|
| 8,571,518 | B2* | 10/2013 | Imes et al. ................... | 455/408 |
| 8,710,796 | B2* | 4/2014 | Muller et al. ................ | 320/109 |
| 8,872,480 | B2* | 10/2014 | DeBoer et al. ............... | 320/134 |
| 2010/0194529 | A1* | 8/2010 | Yamamoto .................. | 340/5.65 |
| 2011/0037429 | A1* | 2/2011 | DeBoer et al. ............... | 320/109 |
| 2011/0169447 | A1* | 7/2011 | Brown et al. ................ | 320/109 |
| 2011/0202217 | A1* | 8/2011 | Kempton ....................... | 701/22 |
| 2012/0091961 | A1* | 4/2012 | Hani et al. .................... | 320/109 |
| 2012/0191242 | A1* | 7/2012 | Outwater et al. ............. | 700/236 |
| 2012/0206098 | A1* | 8/2012 | Kim ............................. | 320/108 |
| 2012/0206100 | A1* | 8/2012 | Brown et al. ................ | 320/109 |
| 2013/0020990 | A1* | 1/2013 | DeBoer et al. ............... | 320/109 |

(Continued)

*Primary Examiner* — Helen Rossoshek (57) ABSTRACT

An electric vehicle charging station with a field upgradeable communications facility is provided. The invention includes a sealable housing including a first compartment and a second compartment, the second compartment including an access to an upgrade port; a partition within the housing that is adapted to insulate the first compartment from the second compartment, the partition including an opening providing access the upgrade port; and an EVSE charging station control circuit configured to recognize a communication module when coupled to the upgrade port and to use the communication module for communications if the communication module is connected. Numerous additional aspects are disclosed.

10 Claims, 10 Drawing Sheets

(56) References Cited

U.S. PATENT DOCUMENTS

| | | |
|---|---|---|
| 2013/0020993 A1* | 1/2013 | Taddeo et al. ............ 320/109 |
| 2013/0021162 A1* | 1/2013 | DeBoer et al. ............ 340/635 |
| 2013/0127416 A1* | 5/2013 | Karner et al. ............ 320/109 |
| 2013/0169220 A1* | 7/2013 | Karner et al. ............ 320/108 |
| 2014/0015487 A1* | 1/2014 | Brown et al. ............ 320/109 |
| 2014/0070757 A1* | 3/2014 | Hong et al. ............ 320/103 |
| 2014/0089016 A1* | 3/2014 | Smullin et al. ............ 705/5 |
| 2014/0203777 A1* | 7/2014 | Flack ............ 320/109 |
| 2014/0365065 A1* | 12/2014 | Leonard et al. ............ 701/29.6 |

* cited by examiner

ELECTRIC VEHICLE CHARGING STATION WITH A FIELD UPGRADEABLE COMMUNICATIONS FACILITY

RELATED APPLICATIONS

This application claims priority to U.S. Provisional Patent Application Ser. No. 61/509,178 filed on Jul. 19, 2011, entitled "FIELD ADDABLE COMMUNICATION ELEMENTS FOR AN ELECTRIC VEHICLE CHARGING SYSTEM (EVSE)" the disclosure of which is hereby incorporated by reference in its entirety herein.

This application also claims priority to U.S. Provisional Patent Application Ser. No. 61/509,171 filed on Jul. 19, 2011, entitled "SYSTEM FOR FLEXIBLE ELECTRICAL AND MECHANICAL INSTALLATION OF AN ELECTRIC VEHICLE CHARGING STATION" the disclosure of which is hereby incorporated by reference in its entirety herein.

FIELD

The present invention relates generally to apparatus, systems and methods adapted to electrically charge electric vehicles, and in particular to communication facilities within an electric vehicle charging station.

BACKGROUND

With the advent of high fuel prices, the automotive industry has reacted with a selection of Electric Vehicles (EVs). Such EVs are propelled by an electric motor (or motors) that are powered by rechargeable power sources (e.g., battery packs). EVs include both full electric and hybrid electric vehicles. Electric motors have several advantages over internal combustion engines. For example, electric motors may convert about 75% of the chemical energy from the batteries to power the wheels, whereas internal combustion engines are considerably less efficient. EVs emit no tailpipe pollutants when operating in battery mode. Electric motors provide quiet, smooth operation, strong acceleration and require relatively low maintenance. However, most current EVs can only go about 100 to 200 miles before requiring electrical recharging.

Fully recharging an EV's battery pack may take about 4 to 8 hours. Even a quick charge to about 80% capacity can take about 30 minutes. Furthermore, as battery pack size increases, so does the corresponding charging time. To expedite charging it is desirable to use a higher voltage power supply. A 240V charging station can reduce charging time by 50 to 100 percent compared to a 120V charging station.

EV charging may take place at the owner's residence using an electric vehicle charging station, sometimes referred to as electric vehicle supply equipment (EVSE). Such EVSE charging stations may be installed at the residence (e.g., in a garage), on an outside wall, or on a post or other structure, and may be electrically coupled to an electrical load center of the residence. Typically, conventional EVSE charging stations are contained in sealed, insulated housings that are not designed or intended to be opened by anyone except certified electricians and the manufacturer. The high power circuitry in a conventional EVSE charging station includes dangerous open contacts which could easily electrocute anyone accessing the inside of a powered EVSE charging station.

Advancement in technologies related to power distribution management and home networking of "smart" appliances and other devices such as home solar panel power generator systems and windmill systems provide facilities that enable homeowners and utilities the ability to monitor and control such devices via a central computer or remotely via the Internet. However, communications standards (e.g., protocols, interfaces) are frequently changing and any existing home area network (HAN) standards may continue to evolve as better technologies are developed and additional requirements for new devices are identified. Thus, existing communications equipment in existing EVSE stations may become obsolete, incompatible, or otherwise limiting. Therefore, there is a need for systems and methods to prevent or avoid communications equipment in EVSE stations from becoming outdated or limited.

SUMMARY

The present invention provides an electric vehicle charging station with a field upgradeable communications facility. The invention includes a sealable housing including a first compartment and a second compartment, the second compartment including an access to an upgrade port; a partition within the housing that is adapted to insulate the first compartment from the second compartment, the partition including an opening providing access the upgrade port; and an EVSE charging station control circuit configured to recognize a communication module when coupled to the upgrade port and to use the communication module for communications if the communication module is connected.

In some embodiments, the present invention provides an EVSE system. The system includes an EVSE charging station including a sealable housing including a first compartment and a second compartment, the second compartment including an access to an upgrade port, a partition within the housing that is adapted to insulate the first compartment from the second compartment, the partition including an opening providing access the upgrade port, and an EVSE charging station control circuit configured to recognize a communication module when coupled to the upgrade port and to use the communication module for communications if the communication module is connected; a smart meter device including a wireless communication capability adapted to communicate with the EVSE charging station via a home area network (HAN); and a power supplier adapted to provide electricity to the EVSE charging station and to remotely control the EVSE charging station via commands issued through the HAN.

In other embodiments, the present invention includes a method of providing a field upgradeable electric vehicle supply equipment (EVSE) charging station. The method includes providing an EVSE charging station including a sealable housing, the housing including a high power compartment and a field accessible compartment, the field accessible compartment including an access to an upgrade port; providing a partition within the housing that is adapted to insulate the high power compartment from the field accessible compartment, the partition including an opening provided to access the upgrade port; providing a communication module adapted to be coupled to the upgrade port and to provide communications functionality to the EVSE charging station when the communication module is coupled to the upgrade port; and configuring a control circuit of the EVSE charging station to recognize a communication module coupled to the upgrade port and to use the communication module for communications if the communication module is connected.

Still other aspects, features, and advantages of the present invention will be readily apparent from the following detailed description by illustrating a number of exemplary embodiments and implementations, including the best mode contemplated for carrying out the present invention. The present invention can also be implemented using different and other embodiments, and its several details may be modified in various respects, all without departing from the scope of the present invention. Accordingly, the drawings and descriptions are to be regarded as illustrative in nature, and not as restrictive. The drawings are not necessarily drawn to scale. The invention covers all modifications, equivalents, and alternatives falling within the scope of the invention.

DETAILED DESCRIPTION

Reference will now be made in detail to the example embodiments which are illustrated in the accompanying drawings. Wherever possible, the same reference numbers will be used throughout the drawings to refer to the same or like parts. The drawings are not necessarily drawn to scale.

The aforementioned problem of communication facilities in EVSE charging stations becoming outdated or incompatible is overcome by embodiments of the present invention. In particular, the present invention provides an EVSE charging station that includes a port for field upgrading of communications facilities. This is achieved through the use of a housing having at least two separate compartments. The separate compartments allow high-power portions of the charging station circuit to be partitioned from the low-power portions of the charging station circuit. Thus, by locating the upgrade port within the low-power compartment of the housing, the present invention facilitates upgrading the EVSE charging station without needing a certified electrician to access a dangerous, high-power circuit. The upgrade port is adapted to accept a variety of communications modules including modules that will be developed to support future communication standards for home area networks and/or other protocols.

In some embodiments, the present invention provides apparatus and methods for adding future communication capabilities into an EVSE charging station without requiring the replacement of the EVSE charging station. The invention reduces an EV owner's total cost of ownership and allows the EVSE infrastructure to be updated to remain compatible with the evolving "smart" grid (e.g., networked, managed power supply equipment, appliances, and other devices). In addition, the field upgradable communication module is disposed and enclosed so that it is protected from the elements within a weatherproof housing with an interior location that is easily accessed. The inventors of the present invention have observed that conventional EVSE charging stations do not offer a field upgradable communication module that can be replaced by the EV owner.

In some embodiments, the EVSE charging station of the present invention may include a built-in communications capability (e.g., an on-board Zigbee® system-on-chip. ZigBee is a specification for a suite of high-level communication protocols using small, low-power digital radios (e.g., wireless mesh) based on an IEEE 802 standard for personal area networks and/or home area networks (HAN). Applications include wireless light switches, electrical meters with in-home displays, and other consumer and industrial equipment that uses short-range wireless transfer of data at relatively low rates. The technology defined by the ZigBee specification is intended to be simpler and less expensive than other WPANs, such as Bluetooth. ZigBee is targeted at radio-frequency (RF) applications that require a low data rate, long battery life, and secure networking. ZigBee has a defined rate of 250 kbits best suited for periodic or intermittent data or a single signal transmission from a sensor or input device. The ZigBee Smart Energy V2.0 specifications define an IP-based protocol to monitor, control, inform and automate the delivery and use of energy and water. It is an enhancement of the ZigBee Smart Energy version 1 specifications, adding services for plug-in EV charging, installation, configuration and firmware download, prepay services, user information and messaging, load control, demand response and common information and application profile interfaces for wired and wireless networks). This built-in communications capability allows the EVSE charging station to communicate with both home area networks as well as "smart meters" equipped with appropriate communication capabilities and tied into meter data management systems.

In a HAN environment, the EVSE charging station of the present invention can also communicate with existing systems, such as, for example solar panel management systems, to allow the status of the EVSE charging station to be remotely accessible via the existing systems' user interface (e.g., web pages). For example, in some embodiments, the EVSE charging station and the solar panel management system can be represented and managed on the same hosted website. The EVSE charging station would have a number of control/status reporting options that can be performed remotely (e.g., on/off, operational status, EV recharging status, amperage adjustment, checking for errors, power management/load sharing, recharging scheduling to take advantage of off-peak rates, etc.). In addition, by allowing the EVSE charging station to access an EV owner's HAN and integrate with existing systems, such as a solar panel management system, the existing system can monitor and determine interesting information such as what percentage of the electric vehicle "charge" came from a renewable source and homeowners/EV owners can collect larger information about their relative energy consumption versus generation. Further, being able to communicate with a utility meter enables a communication gateway which allows a utility to remotely regulate and retrieve basic information about the EVSE charge state including: on/off status, error state, and current limiting. A higher level of more detailed information can be obtained on the HAN which can include information around detailed metering/charging performance as well as other feature sets that may be defined in the feature.

Thus, the EVSE charging station of the present invention is adapted to be "plug and play" with existing HAN based power/appliance management systems and the EVSE charging station can be configured (e.g., current set) and controlled via devices that are capable of being used to configure/control existing HAN based power/appliance management systems. For example, a smart phone can be used to monitor a remotely hosted solar panel service and the EVSE charging station. In some embodiments, the solar panel service, for example, can communicate via the HAN with the EVSE charging station and can pass parameters such as an amperage adjustment value for regulating the owner's energy consumption. Likewise, EVSE charging station error notices or "recharging complete" notices can be provided to a homeowner's cell phone.

In addition to the built-in communication capability, the EVSE charging station also includes an upgrade port adapted to receive a field upgradable communication module. This field module allows a homeowner/EV owner or utility company to update the communication capabilities of the EVSE charging station as technologies evolve and smart grid standards change. Some examples of field upgradable communication modules that can be installed in the upgrade port include a Wi-Fi module, an Ethernet module, a cellular modem module, a next generation Zigbee® module, and the like. In addition, in some embodiments, a programmable logic controller (PLC) module which includes multiple protocols, memory, and/or applications for the EVSE charging station.

As mentioned above, conventional EVSE charging stations typically do not include communications capabilities. The few conventional EVSE charging stations that do have some communication capabilities only provide inaccessible, unmodifiable, built-in communication capabilities. The EVSE charging station of the present invention provides a hybrid solution that includes a built-in communication capability and an upgrade port for adding a field installable communications module. In some embodiments, the EVSE charging station can include an inexpensive built-in communication capability such as the Zigbee chipset and can also be later be upgraded using the upgrade port to include a more advanced, higher power communications capability such as a Wi-Fi or a cellular modem plug-in module. The present invention provides a balance of flexibility which allows future upgrades from a basic current communication capability built into the device, to an advanced communication ability with next generation communication modules, and then onto future generations of communication protocols/interfaces that will be developed.

The field upgradable communication module may also provide compatibility where the homeowner's HAN does not support the particular protocol of the built-in communications capability. Likewise, if the built-in communications capability does not provide sufficient range or bandwidth for the homeowner's applications, the field upgradable communication module can be used to overcome these problems. For example, if there is a significant distance between the garage where the EVSE charging station is installed and the homeowner's smart meter, a longer range signal maybe needed. For example, a Wi-Fi communications module can be used in the upgrade port of the EVSE charging station so that the stronger signal can reach the smart meter. In another example where the utility company wants to transmit meter data back to their server via a high speed connection instead of via a meter data management system, a Wi-Fi communications module can be used to link in with remotely hosted Wi-Fi enabled HANs that have both a homeowner and utility portal. This connection will again allow the homeowner to obtain information remotely about the EVSE charging station. The Wi-Fi communications module has the advantage of relatively high bandwidth and not being restricted by the developing Zigbee Smart Energy Profile (SEP) 2.0 standard.

The EVSE charging station of the present invention distinguishes over the prior art in that conventional EVSE charging stations are typically either a simple EVSE that cannot be upgraded or a complex and expensive EVSE that includes a computer with high cost features that are not needed by homeowners. The present invention applies the concept of an expansion or upgrade port to an EVSE charging station. The upgrade port allows for various modules to be added to an EVSE charging station. The upgrade port is located in an internal cavity of the EVSE charging station so it is protected from the elements. However, the upgrade port can be accessed when a homeowner or field technician wants to upgrade the unit. A partition between the high voltage area and the area where the upgrade port is located allows the EVSE charging station to be upgraded without having to expose a homeowner or field technician to high-power connections. In this manner, a homeowner or field technician can safely upgrade the EVSE charging station without having to hire a certified electrician or without even disconnecting the station.

In some embodiments, addition of the communication module to the EVSE charging station can function to provide a dual-channel communication capability to the EVSE charging station. For example, an EVSE charging station may include a built-in Zigbee communication capability that is used to transmit limited demand response commands to the smart meter of the utility company's network while a Wi-Fi communications module installed in the upgrade port is used to concurrently communicate more detailed metering information to a homeowner's HAN. Homeowner's can continue to upgrade the communications capabilities of their EVSE charging station to expand their HAN and, at the same time, by using the built-in communication capability, the utility company can be assured that critical utility demand response commands are not disrupted.

Conventional EVSE charging stations typically include a sealed housing that only includes a single compartment. There is no facility for an end-user to discern, locate, or install a field addable communication element. Even if such a communication element could be added, it would be a difficult process to access the compartment where a field addable element could be added. Even if a communication element could somehow be added externally to a conventional EVSE charging station, the weatherproof seal of the enclosure would be impaired.

In some embodiments, a communications module of the present invention can be implemented as a small printed circuit board assembly (PCBA) with a system-on-chip design. Elements of the PCBA can include communication capabilities such as Zigbee, Wi-Fi, cellular modem, wired Ethernet and the like. In a manner similar to that of a memory stick, the PCBA can be shrouded in plastic to prevent risk of damage due to electrostatic discharge. The communications module can include a standard connector for connecting to the upgrade port of the EVSE charging station. For example, a USB interface, a DB-9 connector, an RJ-45 connector, USNAP, or any practicable connector can be used.

The EVSE charging station of the present invention includes a front lid that can be secured with one or more fasteners. The housing is designed so that an end-user can remove the fasteners and lift the front lid to access a compartment (e.g., the field accessible compartment) that includes the upgrade port. The compartment is partitioned from a second compartment (e.g., the factory wired compartment) that houses high-power components. Thus, when the front lid is open, only "safe to contact" areas can be touched by the end-user. In some embodiments, the upgrade port is embodied as a connector that protrudes from the factory wired compartment into the field accessible compartment. The connector of the upgrade port is adapted to receive (e.g., mate with) the connector of the communications module. By simply opening the front lid and plugging the connector of a communications module into the mating connector of the upgrade port, an end-user can add upgraded communications capability to the EVSE charging station of the present invention. Various embodiments of the invention will be explained in greater detail with reference to FIGS. 1 to 8 below.

Figure 1:
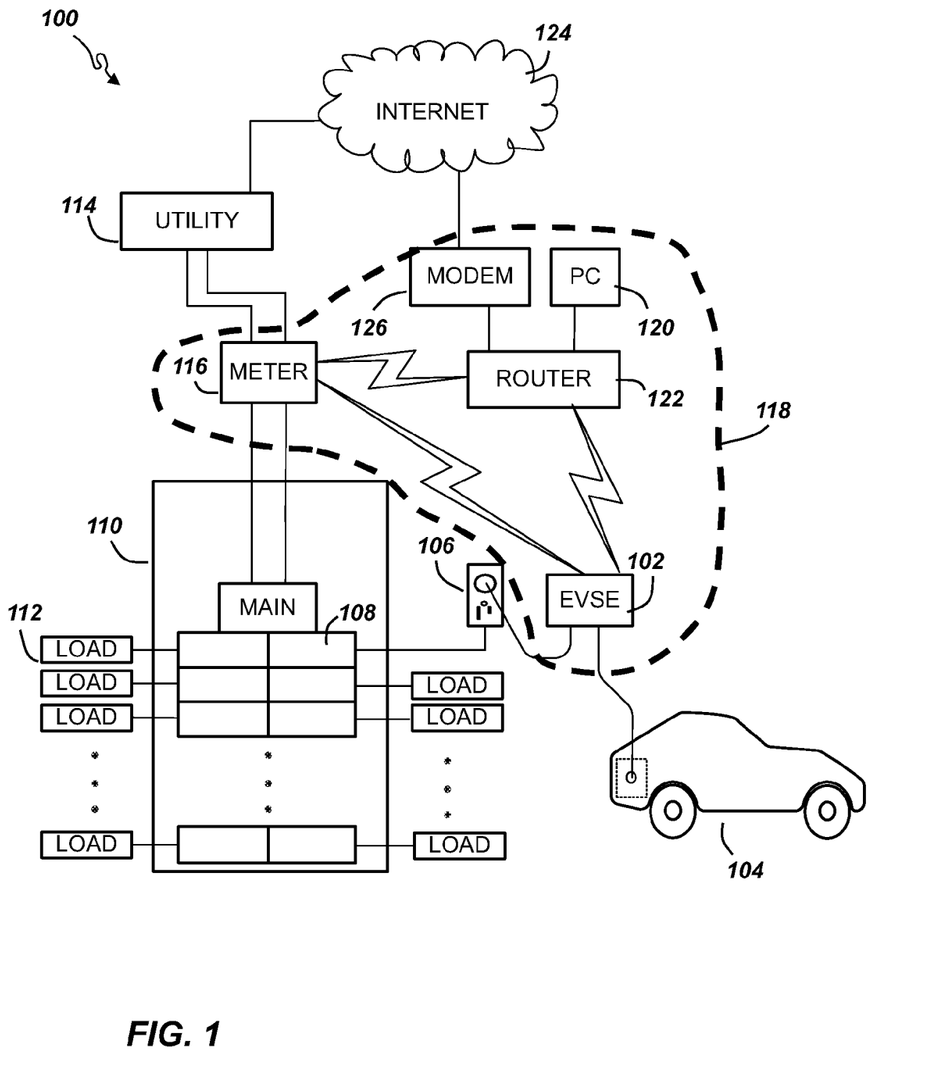
FIG. 1 is a block diagram depicting an example of an electric vehicle supply equipment (EVSE) system according to some embodiments of the present invention.

Turning now to FIG. 1, an example embodiment of an EVSE system 100 is depicted. The EVSE system 100 includes an EVSE charging station 102 which is adapted to connect to an EV 104 and to recharge the EV 104. The EVSE charging station 102 also includes a connection to a power supply such as an outlet 106. The outlet 106 is connected to a circuit breaker 108 within a main load center 110 which also provides power to a number of other loads 112 within the home. The main load center 110 connects to the utility company 114 though a meter 116. In some embodiments, the EVSE system 100 may include a HAN 118 that includes the EVSE charging station 102, a personal computer 120, and the meter 116 all coupled wirelessly or wired to a router 122. The router 122 can be coupled to the Internet 124 via a modem 126. In some embodiments, the router 122 may be incorporated into the meter 116 or the modem 126. The utility company 114 can also be coupled to the Internet 124.

The EVSE charging station 102 is adapted to supply an electrical current output to charge an electrical power source (e.g., a battery pack) of the EV 104. The power may be supplied to the EV 104 via a charging cable with an electrical connector electrically coupled to a receiving connector on the EV 104. The EVSE charging station 102 can be plugged directly into an outlet 106 that is electrically coupled to the circuit breaker 108. The EVSE charging station 102 may include an external electrical cord and a suitable external electrical plug, such as a 240 V NEMA plug. Other plugs may be used. Thus, in the pictured example embodiment, the EVSE charging station 102 is wired with an external cord option and powered through the external electrical cord and external electrical plug.

Figure 2:
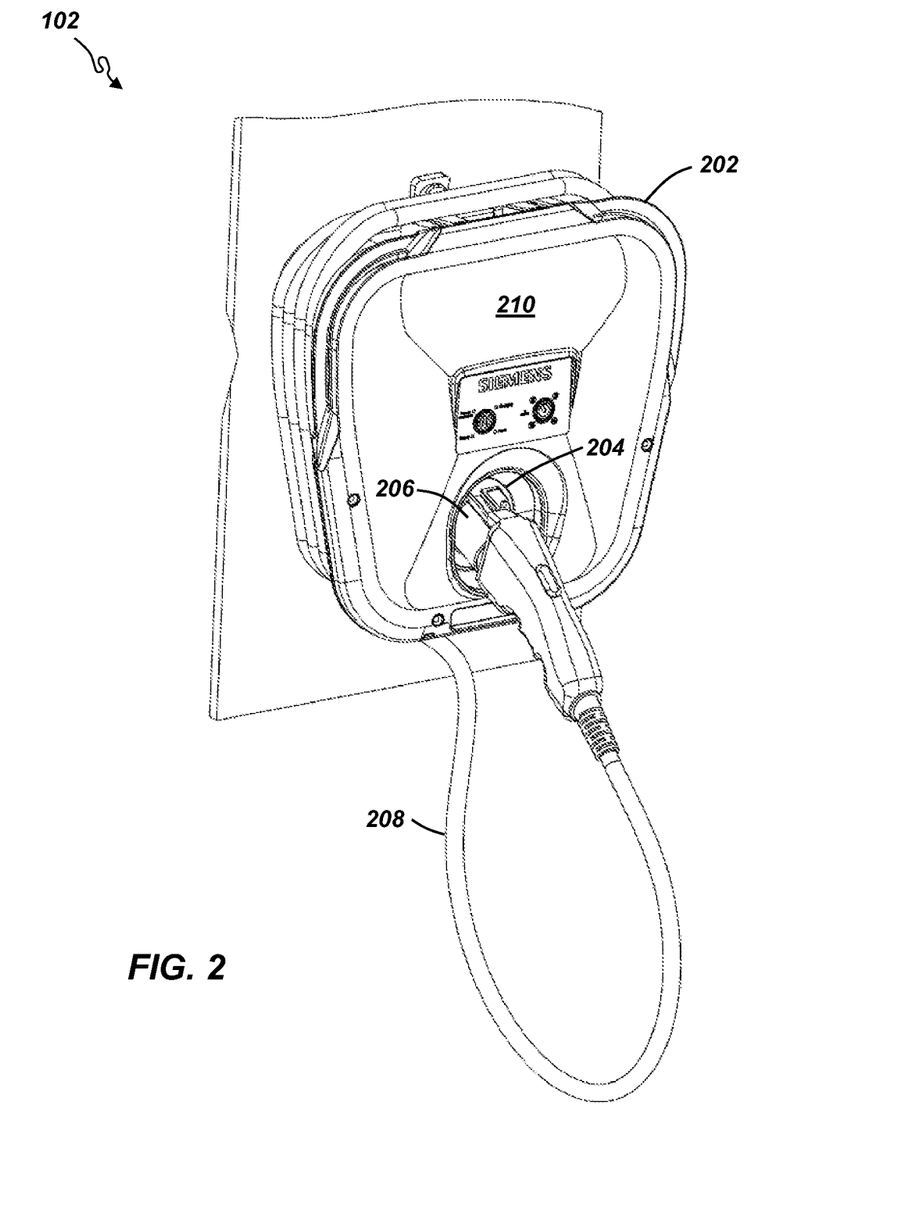
FIG. 2 is a perspective view of an example EVSE charging station according to some embodiments of the present invention.

Turning to FIG. 2, an example embodiment of an EVSE charging station 102 is shown. The EVSE charging station 102 includes a housing 202 that contains the circuitry of the EVSE charging station 102. The housing 202 includes a holder 204 that supports the connector 206 when the EVSE charging station 102 is not in use charging an EV 104. The connector 206 is electrically coupled to the EVSE charging station 102 via the charging cable 208. The charging cable 208 enters the housing 202 at a lower edge of the housing 202. The housing 202 includes a hinged front lid 210 which is held closed by removable fasteners and is adapted to be opened by an end-user. The front lid 210 includes hinges along a top edge that allow the front lid 210 to swing up an out of the way.

Figure 3:
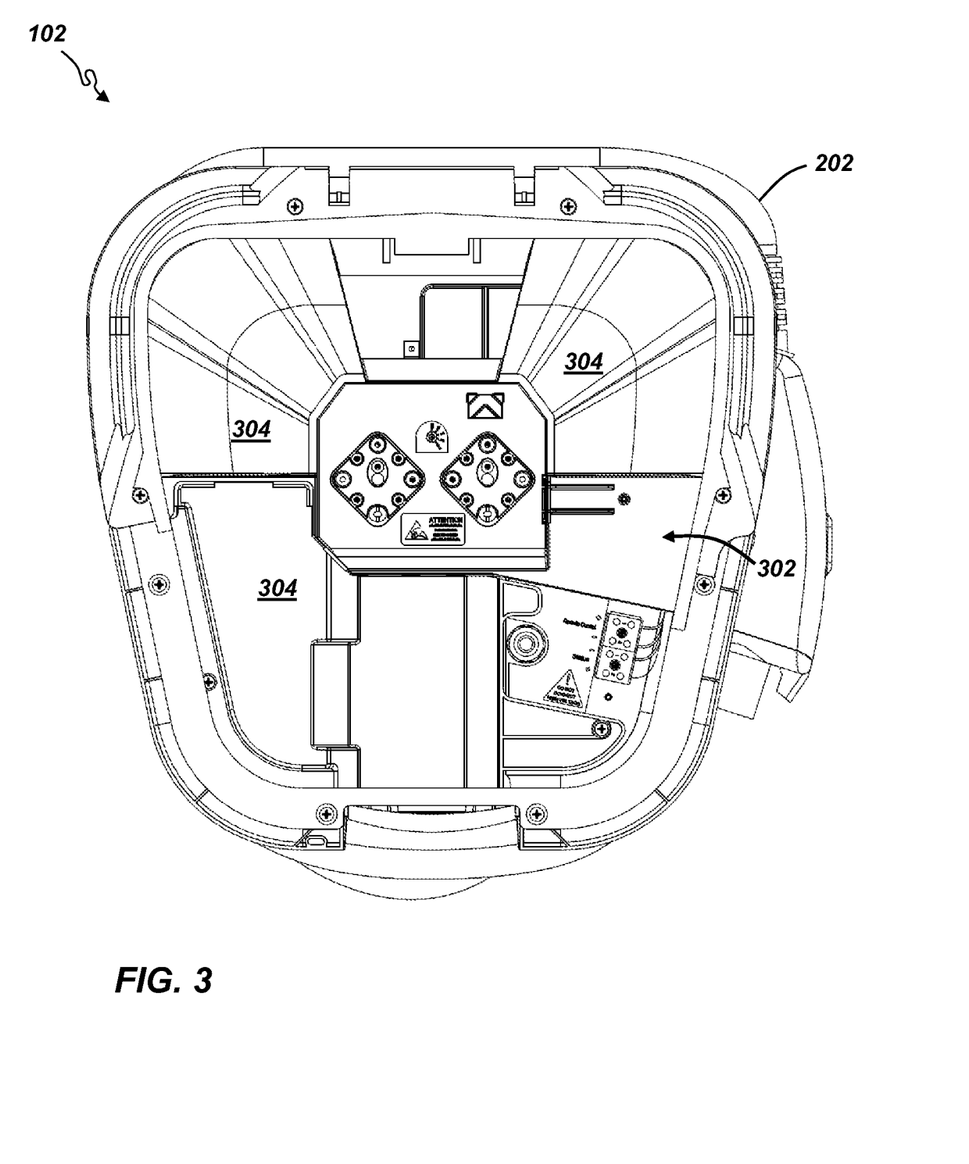
FIG. 3 is a front plan view of various components of an example EVSE charging station with the lid removed (for clarity) according to some embodiments of the present invention.
Figure 4:
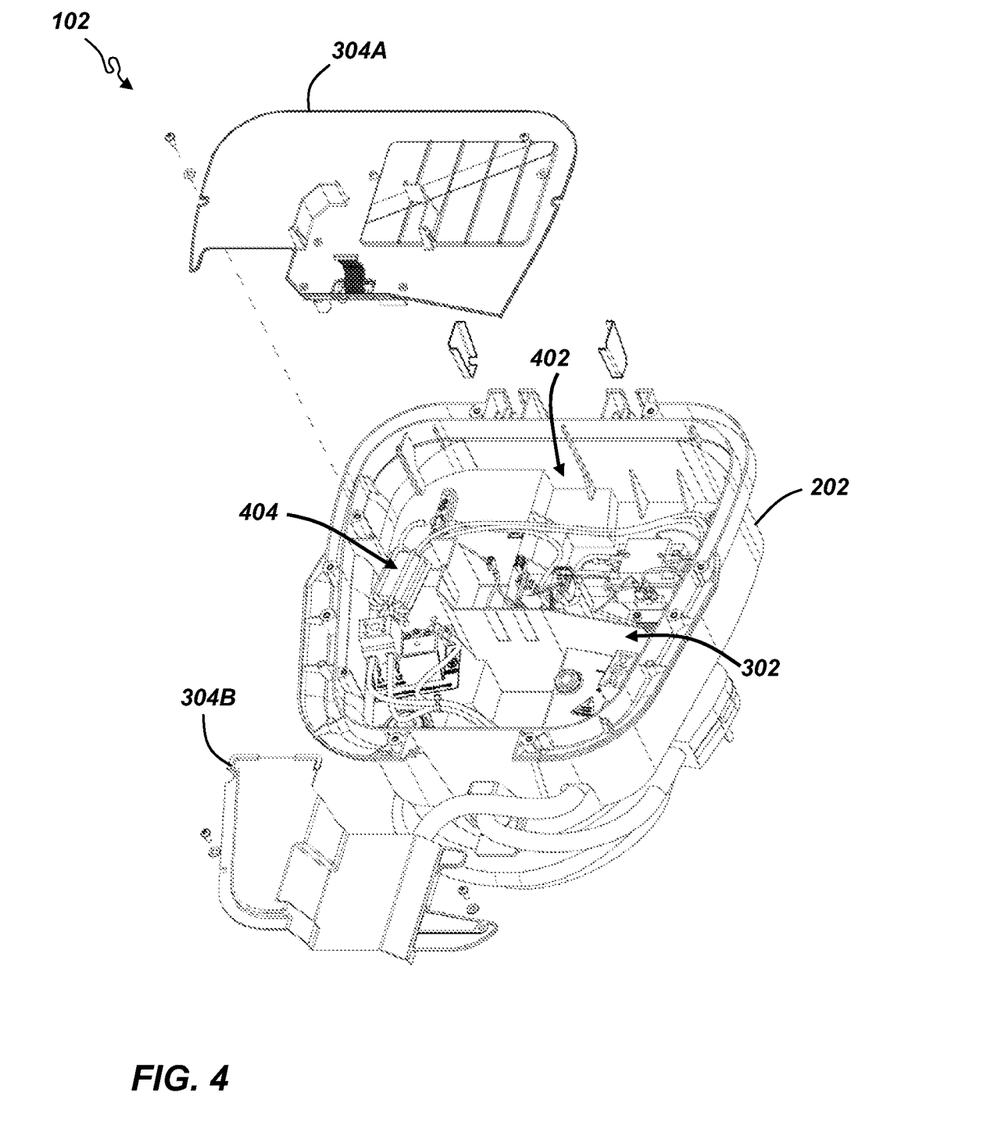
FIG. 4 illustrates a partial exploded view of a first inner cover and a safety cover of an EVSE charging station according to some embodiments of the present invention.

FIG. 3 depicts an example embodiment of an EVSE charging station 102 with the front lid 210 removed for clarity. Normally the front lid 210 would remain attached to the housing 202 via the top hinges. With the front lid 210 removed, the field accessible compartment 302 of the EVSE charging station 102 is visible. In addition, separating the field accessible compartment 302 from the factory wired compartment (i.e., the location of the high-power components) is an insulating partition 304. The exploded perspective view of FIG. 4 more clearly illustrates the partition 304 which is shown in two pieces 304A and 304B. Also visible in FIG. 4 is the factory wired compartment 402 which houses the high-power components 404 of the EVSE charging station 102.

Figure 5A:
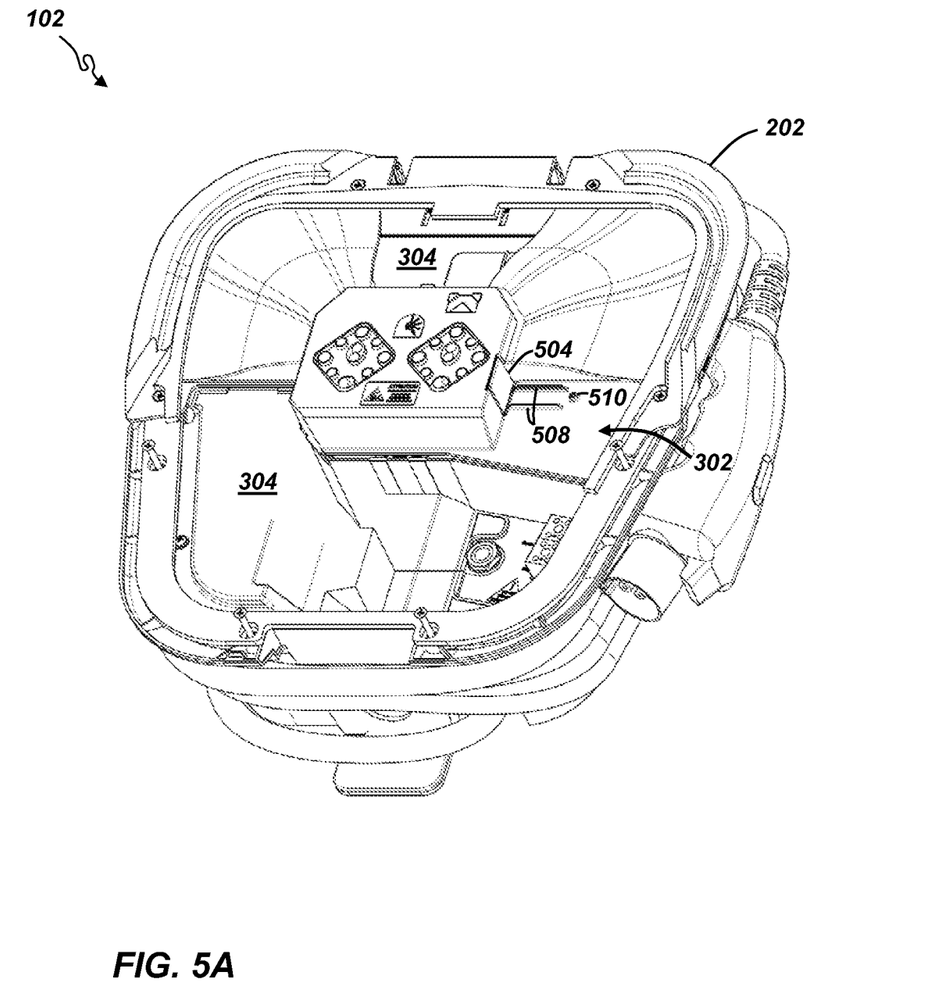
FIG. 5A is a perspective view of an example EVSE charging station including a field upgradable communication port according to some embodiments of the present invention.
Figure 5B:
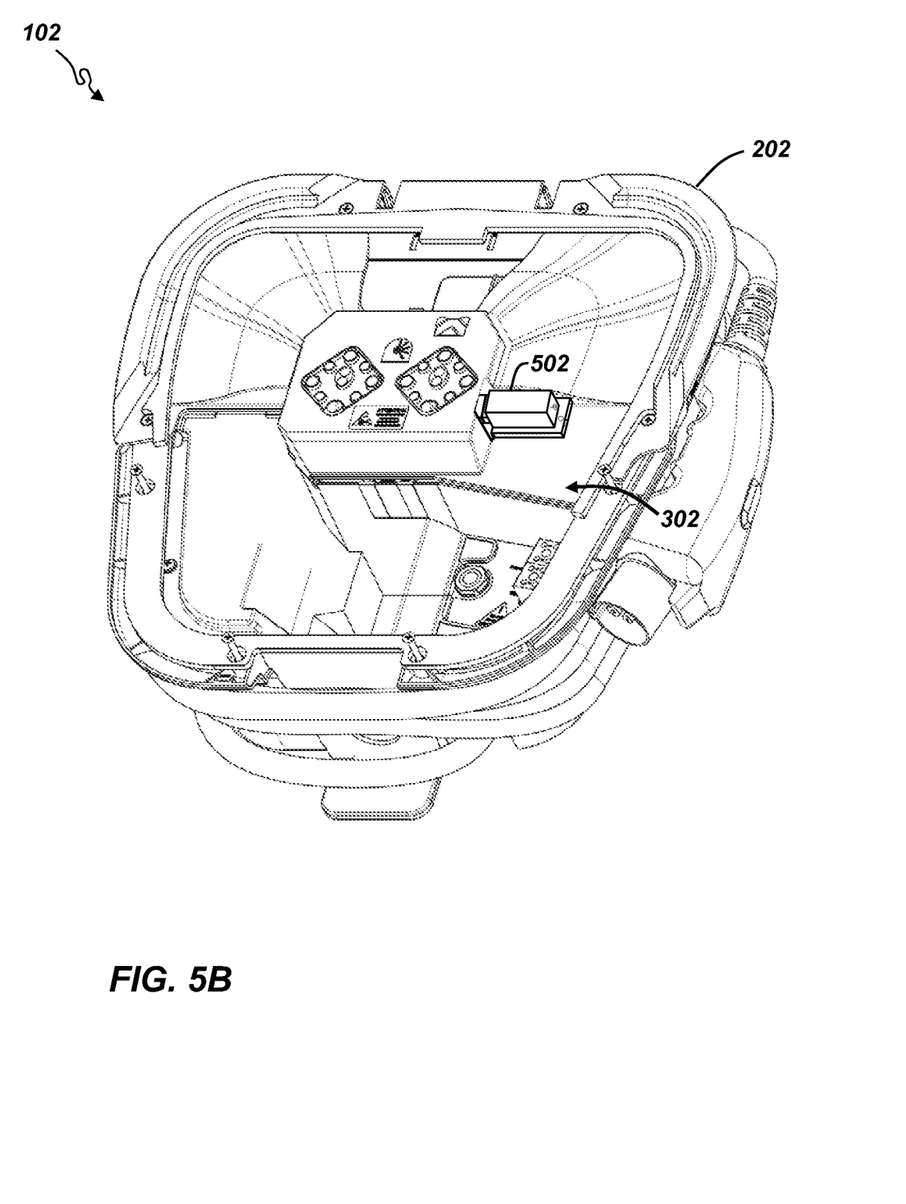
FIG. 5B is a perspective view of an example EVSE charging station including an installed communication module upgrade according to some embodiments of the present invention.
Figure 5C:
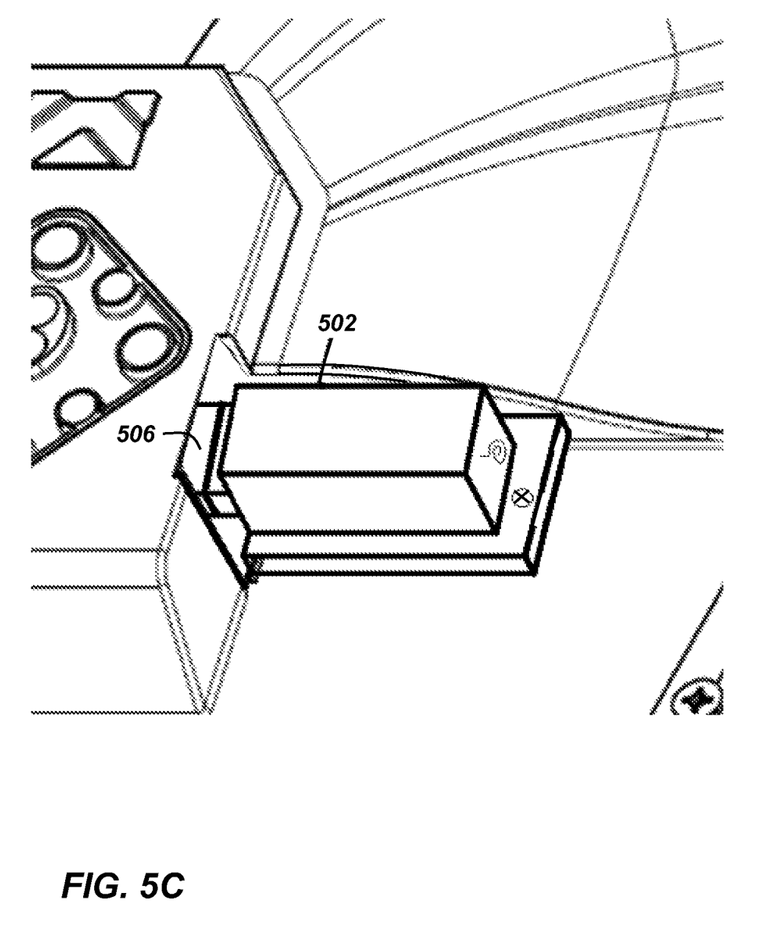
FIG. 5C is a magnified perspective view of an example communication module installed in an EVSE charging station according to some embodiments of the present invention.

Turning now to FIGS. 5A and 5B, a perspective view of the EVSE charging station 102 with and without (respectively) a communication module 502 installed are provided. In FIG. 5A, a removable door 504 covers the upgrade port 506 (not visible in FIG. 5A). In FIG. 5B, the door 504 has been removed and the communication module 502 has been installed. The communication module 502 is plugged into the upgrade port 506 and secured to the EVSE charging station 102 using rails 508 and fastener 510 (visible in FIG. 5A). FIG. 5C provides a magnified view of the communication module 502 shown in FIG. 53.

Figure 6:
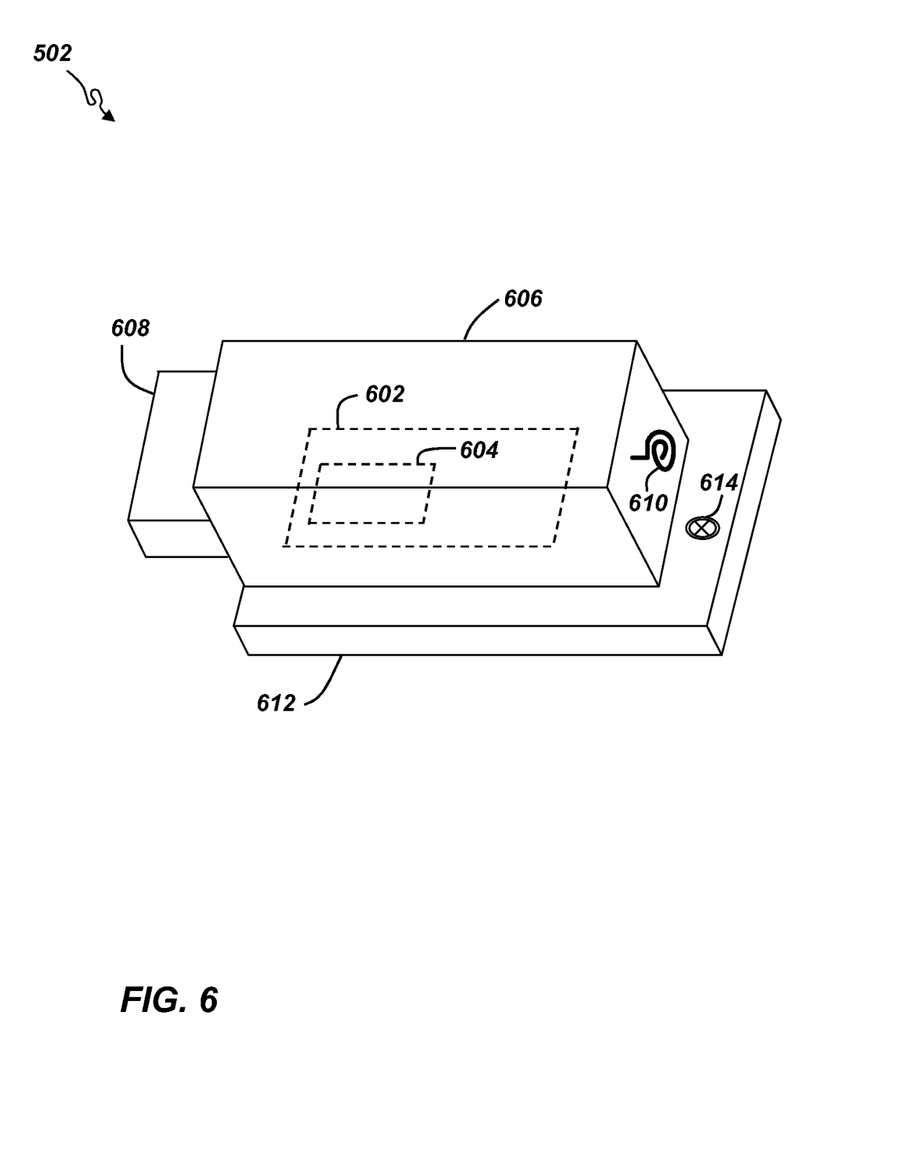
FIG. 6 is a magnified perspective view of an example communication module for an EVSE charging station according to some embodiments of the present invention.

FIG. 6 is a magnified perspective view of an example embodiment of a communications module 502. As mentioned above, in some embodiments, a communications module 502 can be implemented as a small printed circuit board assembly (PCBA 602) with a system-on-chip design 604. Elements of the PCBA can include communication capabilities such as Zigbee, Wi-Fi, cellular modem, wired Ethernet and the like. In a manner similar to that of a memory stick, the PCBA 602 can be shrouded in a plastic casing 606 to prevent risk of damage due to electrostatic discharge. The communications module 502 can include a standard connector 608 for connecting to the upgrade port 506 of the EVSE charging station 102. For example, a USB interface, a DB-9 connector, an RJ-45 connector, USNAP, or any practicable connector can be used. The communications module 502 can also include an antenna 610 to support the communications capability. The example embodiment of the communications module 502 shown in FIG. 6 also includes a mounting sled 612 coupled to the plastic casing 606 that attaches to the rails 508 in the field accessible compartment 302 of the EVSE charging station 102 and includes a hole 614 for securing the sled 612.

Figure 7:
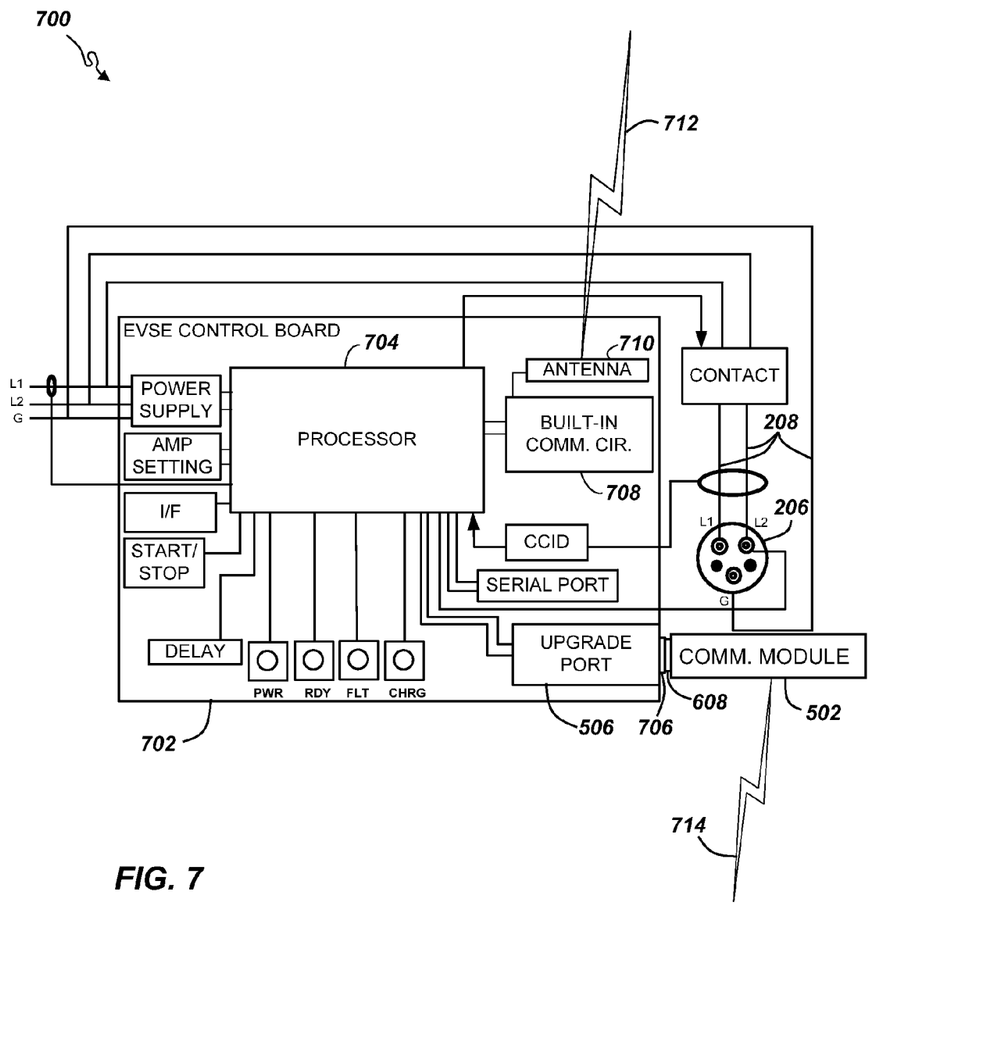
FIG. 7 is a block diagram depicting a schematic representation of an EVSE charging station control circuit according to some embodiments of the present invention.

Turning now to FIG. 7, an example embodiment of an EVSE charging station control circuit 700 for an EVSE charging station 102 is depicted. The EVSE charging station control circuit 700 is housed in the high power/factory wired compartment 402 of the housing 202 and includes an EVSE control board 702 with various components of the control circuit 700 mounted thereon. The components include a programmed processor 704 and associated memory (not shown). Among a number of other components, the processor 704 is coupled to, and operable to communicate with, an upgrade port 506 which includes a connector 706 adapted to receive the connector 608 of the communications module 502 (FIG. 6).

In some embodiments, the processor 704 is also connected to a built-in communications circuit 708 that is adapted to communicate (e.g., wirelessly) with other devices or systems. The built-in communication circuit 708 may have an antenna 710 connected to the built-in communication circuit 708 and be adapted to send and receive wireless signals 712 according to a suitable protocol to and from the device or system. For example, the built-in communication circuit 708 may be used to communicate with a smart grid node of a utility company, a smart meter of a utility, a HAN, an electrical load panel, an internet portal, and the like so as to link to a service provider or application, such as to perform diagnostics, receive control instructions, send status information, receive software updates, or the like. Any suitable communication protocol may be used, such as Zigbee, Wi-Fi, cellular modem, Ethernet and the like.

Likewise, when a field addable communications module 502 is coupled to the upgrade port 506 of the EVSE charging station control circuit 700 as shown in FIG. 7, the EVSE charging station 102 can additionally or alternatively communicate (e.g., wirelessly) with other devices or systems via this second communications channel. The EVSE charging station control circuit 700 is configured to automatically recognize the communication module 502 and to activate the module 502 for use. For example, the EVSE charging station control circuit 700 will automatically attempt to join a HAN according to the communication protocol of the module 502. As indicated above, the field addable communications module 502 may have an antenna 610 connected to the field addable communications module 502 and be adapted to send and receive wireless signals 714 according to a suitable protocol to and from the device or system. For example, the field addable communications module 502 may be used to communicate with a smart grid node of a utility company, a smart meter of a utility, a HAN, an electrical load panel, an internet portal, and the like so as to link to a service provider or application, such as to perform diagnostics, receive control instructions, send status information, receive software updates, or the like. Any suitable communication protocol may be used, such as Zigbee, Wi-Fi, cellular modem, Ethernet and the like.

Figure 8:
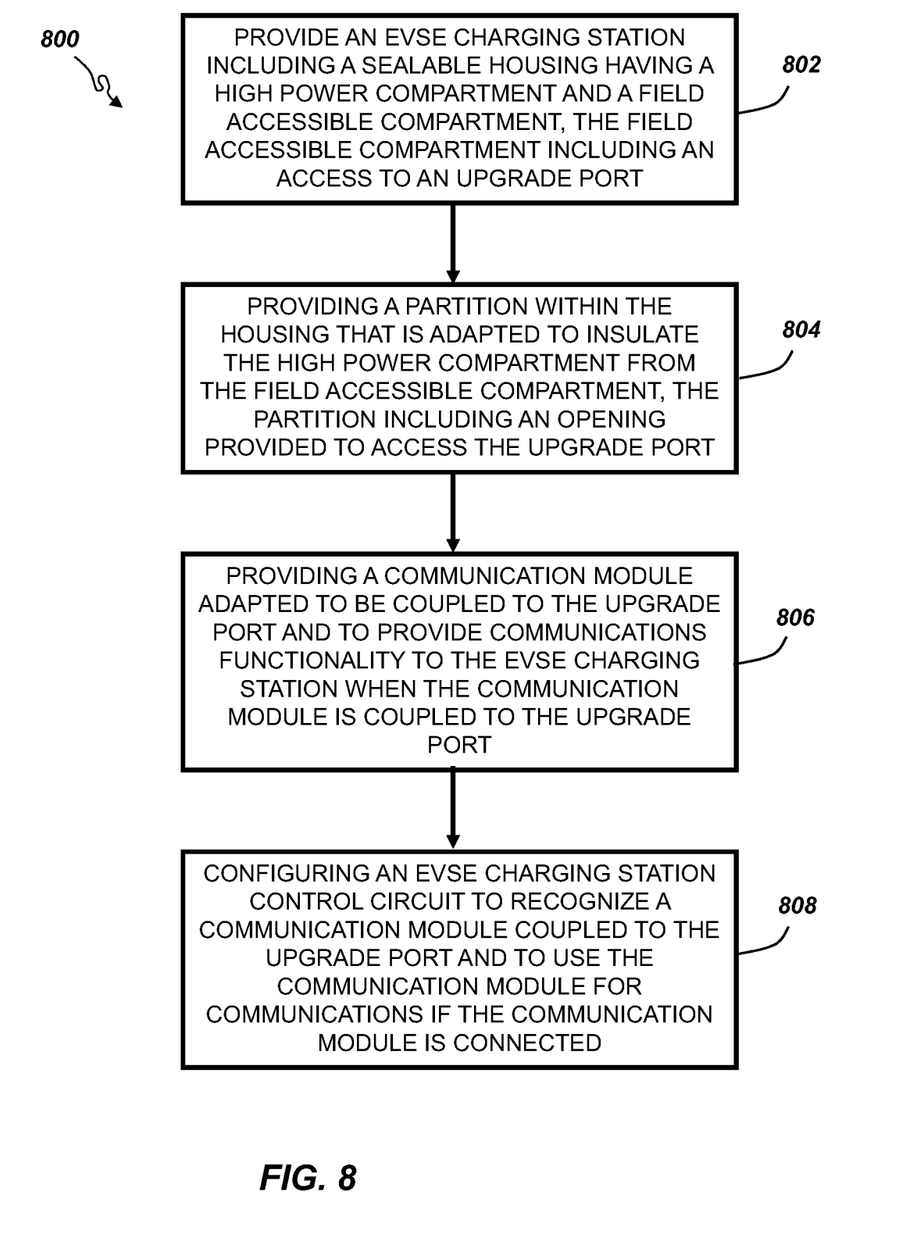
FIG. 8 is a flowchart depicting an example method of upgrading an EVSE charging station with a field installable communications module according to some embodiments of the present invention.

Turning to FIG. 8, an example method 800 of providing a field upgradeable EVSE charging station according to some embodiments of the present invention is illustrated in a flowchart. In step 802, an EVSE charging station is provided including a sealable housing including a high power compartment and a field accessible compartment, the field accessible compartment including an access to an upgrade port. In step 804, a partition is provided within the housing that is adapted to insulate the high power compartment from the field accessible compartment, the partition including an opening provided to access the upgrade port. In step 806, a communication module is provided, the communication module adapted to be coupled to the upgrade port and to provide communications functionality to the EVSE charging station when the communication module is coupled to the upgrade port. In step 808, an EVSE charging station control circuit is configured to recognize a communication module coupled to the upgrade port and to use the communication module for communications if the communication module is connected.

It should be readily appreciated by those persons skilled in the art that the present invention is susceptible of broad utility and application. Many embodiments and adaptations of the present invention other than those herein described, as well as many variations, modifications, and equivalent arrangements, will be apparent from, or reasonably suggested by, the present invention and the foregoing description thereof, without departing from the substance or scope of the present invention. Accordingly, while the present invention has been described herein in detail in relation to specific embodiments, it is to be understood that this disclosure is only illustrative and presents examples of the present invention and is made merely for purposes of providing a full and enabling disclosure of the invention. This disclosure is not intended to limit the invention to the particular systems or methods disclosed, but, to the contrary, the intention is to cover all modifications, equivalents, and alternatives falling within the scope of the invention.

What is claimed is:

1. An electric vehicle supply equipment (EVSE) charging station comprising:
   a sealable housing including a first compartment adapted to house high power electrical components and a second compartment adapted to house non-high power electrical components formed in part by a lid, the second compartment including an access to an upgrade port wherein a communication module is adapted to couple to the upgrade port within the second compartment accessible under the lid;
   a partition within the housing that is adapted to insulate the first compartment from the second compartment; and
   an EVSE charging station control circuit configured to recognize a communication module when coupled to the upgrade port and to use the communication module for communications if the communication module is connected.

2. The EVSE charging station of claim 1 further including a communication module adapted to be coupled to the upgrade port and to provide communications functionality to the EVSE charging station when the communication module is coupled to the upgrade port.

3. The EVSE charging station of claim 1 wherein the sealable housing is adapted to seal both the first and second compartments against weather.

4. The EVSE charging station of claim 1 wherein the second compartment is adapted to be field accessible.

5. The EVSE charging station of claim 1 wherein the communication module includes a Wi-Fi protocol communications capability.

6. The EVSE charging station of claim 1 further including a built-in communications circuit included within the EVSE charging station control circuit.

7. A method of providing a field upgradeable electric vehicle supply equipment (EVSE) charging station, the method comprising:
   providing an EVSE charging station including a sealable housing including a lid, a high power compartment and a field accessible compartment accessible under the lid, the field accessible compartment including an access to an upgrade port;
   providing a partition within the housing that is adapted to insulate the high power compartment from the field accessible compartment;
   providing a communication module adapted to be coupled to the upgrade port, the communication module contained within the second compartment accessible under the lid and to provide communications functionality to the EVSE charging station when the communication module is coupled to the upgrade port; and
   configuring a control circuit of the EVSE charging station to recognize a communication module coupled to the upgrade port and to use the communication module for communications if the communication module is connected.

8. The method of claim 7 wherein the field accessible compartment is adapted to house non-high power electrical components.

9. The method of claim 7 wherein the communication module includes a Wi-Fi protocol communications capability.

10. The method of claim 7 further including communicating with a built-in communications circuit included within the control circuit of the EVSE charging station.

\* \* \* \* \*